F. C. BUSCH.
CHUCKING DEVICE.
APPLICATION FILED OCT. 26, 1916. RENEWED SEPT. 15, 1917.
1,265,606.
Patented May 7, 1918.
3 SHEETS—SHEET 3.
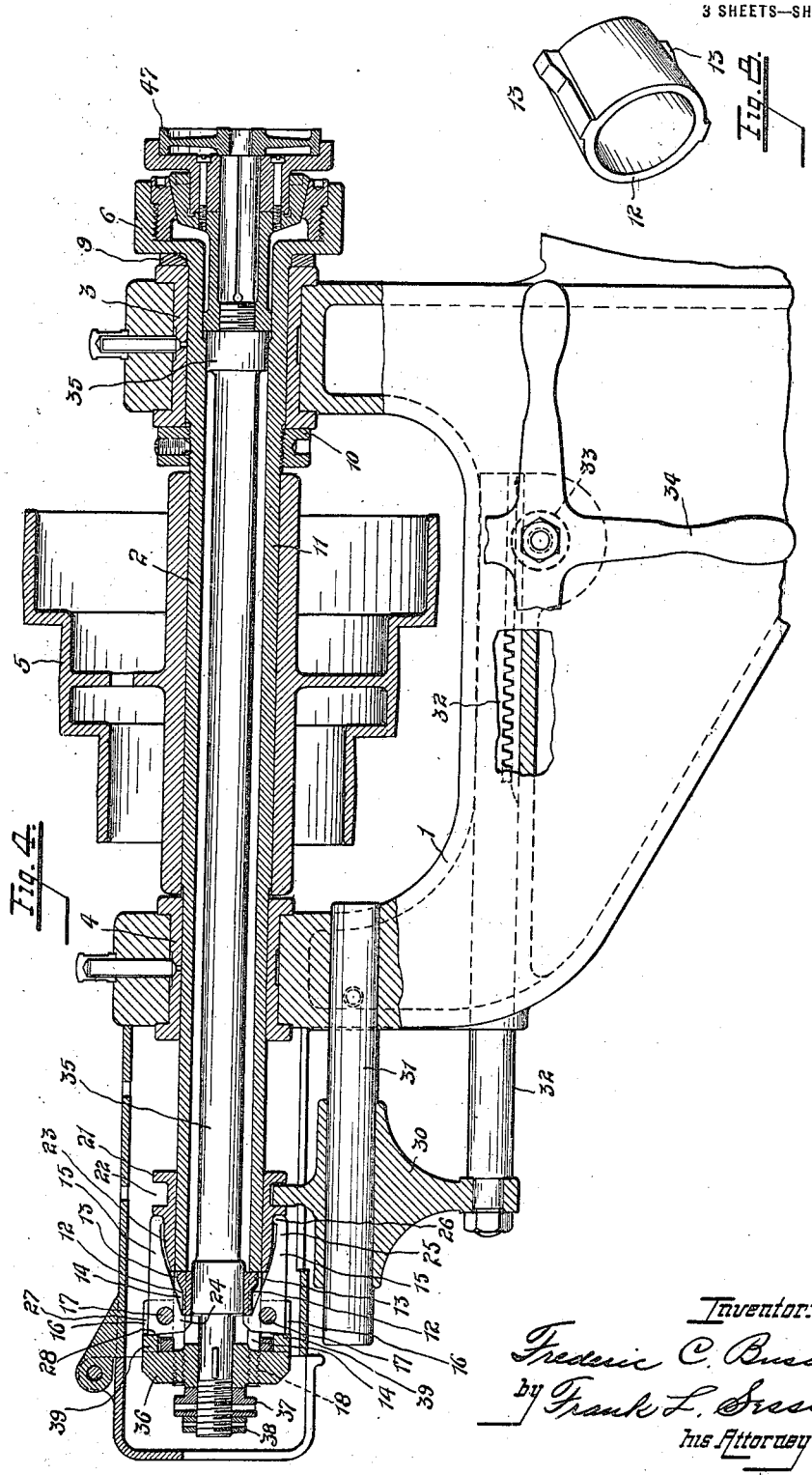
Inventor:
Frederic C. Busch,
by Frank L. Sessions,
his Attorney

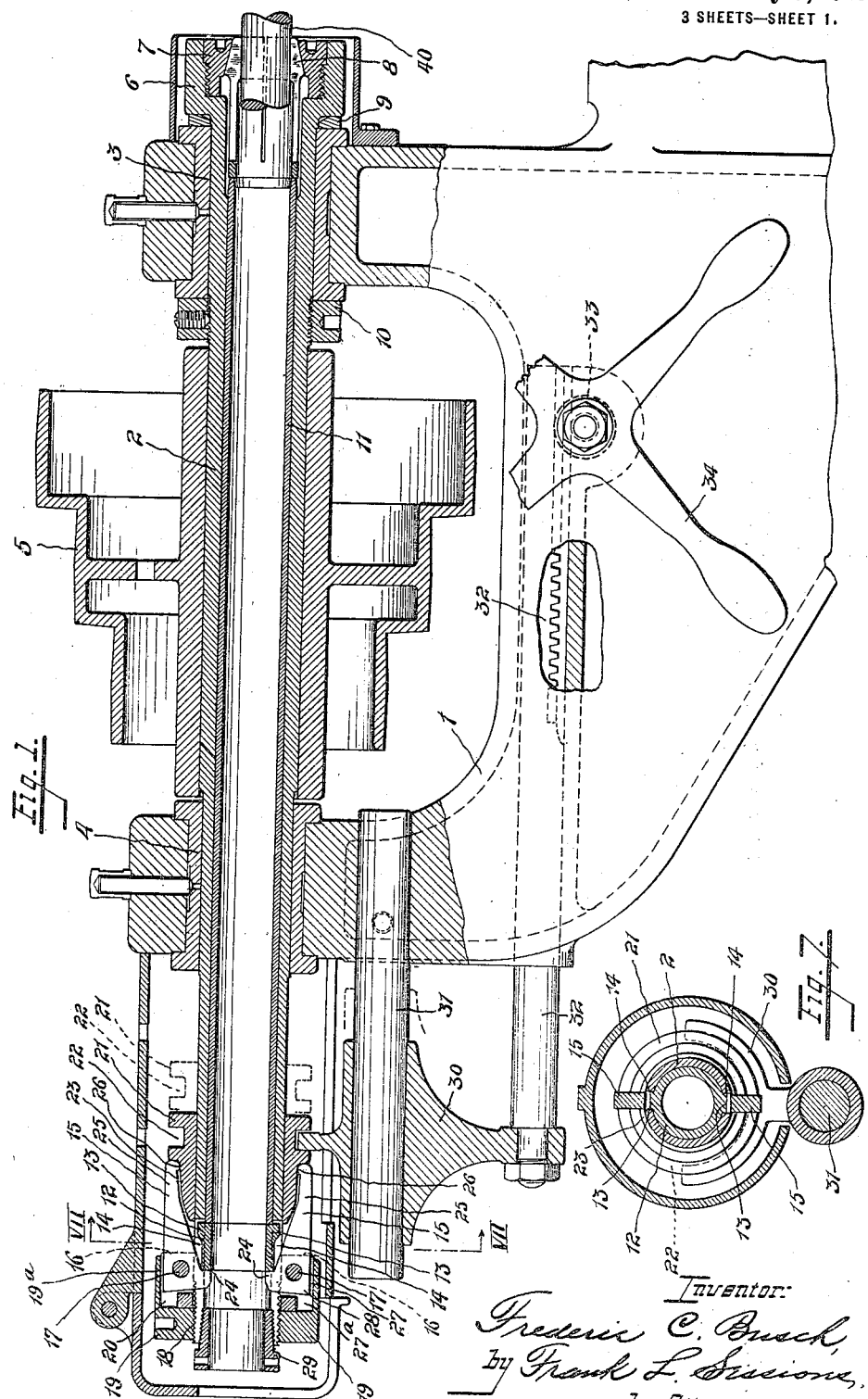

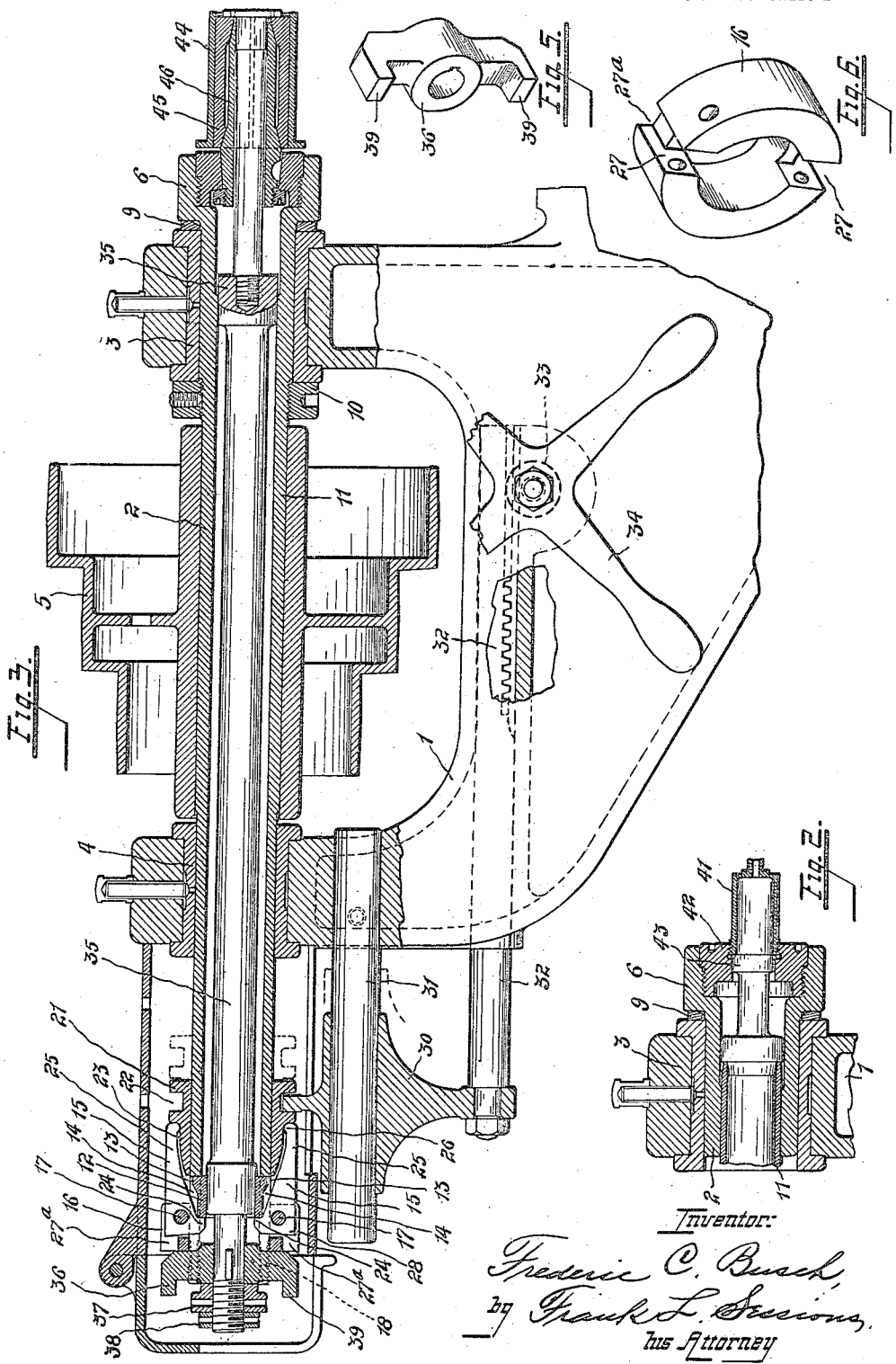

UNITED STATES PATENT OFFICE.

FREDERIC C. BUSCH, OF CLEVELAND, OHIO, ASSIGNOR TO BARDONS AND OLIVER, OF CLEVELAND, OHIO, COMPOSED OF GEORGE C. BARDONS AND JOHN G. OLIVER.

CHUCKING DEVICE.

1,265,606.  Specification of Letters Patent.  Patented May 7, 1918.

Application filed October 26, 1916, Serial No. 127,931. Renewed September 15, 1917. Serial No. 191,653.

*To all whom it may concern:*

Be it known that I, FREDERIC C. BUSCH, a citizen of the United States, residing at Cleveland, in the county of Cuyahoga and State of Ohio, have invented certain new and useful Improvements in Chucking Devices, of which the following is a specification.

My invention relates to chucking devices in general use by the manufacturers of turret lathes. Similar devices are also applicable to other classes of machine tools.

Heretofore, the spindles of such machines have been provided in general, with either one of the two varieties of so-called automatic chucks. One of these varieties is known as a "push-out" chuck, and the other as a "draw-back" chuck. The "push-out" chuck is the type ordinarily employed for handling rods which are fed through the hollow lathe spindle. It may also be employed for handling short pieces which may be mounted upon an expanding mandrel, or seized in a collet, or screwed into or upon an adapter, as will be apparent from these specifications. The "draw-back" chuck is ordinarily used for work which cannot be fed through the lathe spindle, or which may require special means for holding it which means lends itself more readily to a "draw-back" motion. The choice of either variety of these chucks is determined by the kind of work being done, and the kind and shape of piece being machined.

It has been customary to make machines with either the "push-out" type or the "draw-back" type of chuck, although occasionally it has been found desirable to furnish a machine arranged so that it could be used for both types. To meet this requirement, however, it was necessary to make quite radical and expensive changes, in the design, and to provide numerous additional parts. Considerable time was necessarily required to change from one to the other.

The object of my invention is to provide means whereby either the push-out or draw-back operated chuck may be readily used in the same lathe without its being necessary to make expensive, time consuming changes. A further object of my invention is to reduce the cost of changing existing lathes, fitted with push-out chuck, so that either push-out or draw-back chucks or collets may be used in such lathes.

By the use of my improvements, it is possible to use the same lathe spindle for both the push-out and draw-back types of chuck, and the changes necessary to adapt the lathe for the operation of one or the other type, are extremely simple. Very few different parts are required for the use of either type. When lathes are furnished with my improvements, it will be unnecessary for the customer to specify, as has heretofore been the case, whether he desires a lathe for use with push-out, or draw-back collets, as the parts necessary to change from one type to the other are so simple and inexpensive that they can be made a part of the original equipment, or added at any time.

My invention is clearly shown in the accompanying drawings in which Figure 1 is a vertical longitudinal section through the head stock and spindle of a lathe provided with a push-out operated collet, arranged for handling bar stock, the stock feeding mechanism being omitted in this drawing;

Fig. 2 is a vertical longitudinal section through the collet end of the head stock spindle of a lathe, in which a push-out chucking device is shown in use with an adapter arranged for holding an externally threaded piece such as a grease cup, which is being machined;

Fig. 3 is a vertical longitudinal section through the same lathe when provided with my improved draw-back mechanism for chucking devices;

Fig. 4 is a vertical longitudinal section of a lathe in which the parts of my improved draw-back mechanism are arranged to give increased movement to the plunger;

Fig. 5 is a detail of the thrust collar used in my improved draw-back mechanism;

Fig. 6 is a detail of the finger holder;

Fig. 7 is a cross section on line VII—VII, of Fig. 1; and

Fig. 8 is a detail of the plunger follower.

Referring to the drawings, 1 is a lathe head stock in which the hollow lathe spindle, 2, revolves in bearings, 3, 4. A driving, cone pulley, 5, is conventionally shown on the spindle, it being understood that my improvements may be embodied in any suitable machine, regardless of the manner in which the spindle is driven, and regardless of whether the work holding spindle revolves or is fixed.

The front end of the spindle, next to the work, may be of any desired form; for my present purpose, I have adopted what is known as the internal type. This is shown enlarged to form a head, 6, for receiving the usual adapter, 7, which is threaded into the spindle head, 6, as shown in Fig. 1. 8 is a well known form of collet used for holding bar or rod stock.

The spindle, 2, is held against endwise movement by the spindle head, 6, which is provided with a wearing washer, 9, and by the adjustable thrust collar, 10, which bear upon opposite ends of the bearing, 3. It will be understood that any other means for preventing end play of the spindle may be employed as this feature forms no part of my improvement.

Within the hollow spindle, 2, and having a sliding fit therein is the hollow plunger, 11. The plunger, 11, is somewhat shorter than the spindle, 2. The front end of plunger, 11, abuts against the collet, 8, and the plunger extends back, part of the distance, through the hollow spindle, 2. At the rear end of plunger, 11, is a hardened steel follower, 12, which, as shown in Fig. 8, is provided with projections, 13, 13, which slide in longitudinal slots, 14, 14, in the tail end of spindle 2. The inner end of slot, 14, forms a depressed transverse shoulder on spindle, 2, which becomes a fulcrum for lever, 15, in my improved draw-back device. It will be understood that follower, 12, is merely a convenient means for providing a hard and easily renewable part of the fingers, 15, 15, to act upon.

The rear end of a spindle, 2, extends out beyond the bearing, 4, and is slotted as shown at 14, 14, to receive the bell-crank levers or fingers, 15, 15, which are pivoted to the sleeve or finger-holder, 16, by pins, 17, 17. Finger-holder, 16, is slidably mounted on spindle, 2. The spindle, 2, is externally threaded at 18 to receive the adjustable thrust collar, 19, which is counterbored at 20 to receive the sleeve, 16, while the cylindrical shell portion, 19ª, of thrust collar, 19, serves as a retainer for the pins, 17, 17.

Upon the spindle, 2, is mounted the sliding wedge collar, 21, which is provided with a shifter groove, 22, and a tapered extension, 23.

The short arms, 24, 24, of fingers, 15, 15, abut against follower, 12, and the long arms, 25, 25, are provided with projections, 26, 26, which are adapted to slide upon the tapered extension, 23, of wedge collar, 21.

Slots, 27, 27, are formed in sleeve, 16, to receive the fingers, 15, 15, and these slots are of such a depth in the inner end face of the sleeve, in machines as at present constructed, as to clear the knuckles, 28, 28, of the fingers when the ends, 25, 25, are forced outward by the sliding wedge collar, 21.

Slots, 27, 27, are extended longitudinally through the sleeve or finger-holder, 16, as shown at 27ª, 27ª, for the purpose of receiving projections upon the thrust collar of the form which I prefer to use with my improved draw-back operating device which is later described in these specifications.

The spindle, 2, is threaded internally to receive an externally threaded, tapered thimble, 29, which serves to expand the slotted end of spindle, 2, and securely lock the thrust collar, 19, in its adjusted position, and also protects the end of the spindle from undue wear or injury from the bar stock which may be fed through it.

Wedge collar, 21, is operated by a forked shifter, 30, of usual construction which slides upon a guide, 31, which is secured to the head stock or lathe frame. Shifter, 30, is operated by a rack bar, 32, to which it is secured. The rack bar, 32, slides in longitudinal guides in the head stock or lathe frame and is actuated by the toothed pinion, 33, and star hand wheel, 34, in a well known manner.

The operation of the push-out chucking device above described is as follows:

The work, whether it be long bar stock fed through the hollow spindle or a short piece inserted into the chuck at the head end of the spindle, is placed in the open chuck and the wedge collar, 21, is shifted toward the fingers, 15. The long arms, 25, of the fingers, 15, are forced outward by the wedge collar, causing the fingers to rock about the pins, 17. The short arms, 24, of the fingers, 15, engage and push the follower, 12, which pushes the plunger, 11, forward against the collet, 8, causing its externally tapered portion to be forced into the corresponding internally tapered portion of adapter, 7, and the diameter of the collet is thereby contracted upon the work. During this movement of the fingers, 15, the sleeve or finger-holder, 16, is forced back against thrust collar, 19. Slot, 14, is of such a depth that there is a clearance space between the projection, 13, and the bottom of the slot when the plunger, 11, has been moved to the limit of its travel toward the head end of the spindle.

It will be noted that the finger, 15, is in this case a lever of the first class, the load being applied to the short arm, 24, the fulcrum being the pin, 17, and the power being applied to the long end, 25.

This is, at present, a well known arrangement of parts and method of operating a push-out collet. To change a machine, constructed as above described, so as to incorporate in it a draw-back operated collet or chucking mechanism, various means have been employed, all of them with which I am familiar being expensive and not readily applied.

In my improved mechanism for operating draw-back chucking devices, which is well illustrated in Figs. 3 and 4, the same lathe spindle, 2, spindle head, 6, follower, 12, fingers, 15, finger-holder, 16, pins, 17, and wedge collar, 21, may be used which are found in the design shown in Fig. 1. Instead of the hollow plunger, 11, I employ a solid rod, 35, which has sliding bearing portions in the spindle, 2, and follower, 12. The adjustable thrust collar, 19, is not required in my draw-back device.

To accomplish the reversal of direction of the force required to operate a draw-back chucking mechanism, as compared to that required to operate one of the push-out type, I provide a modified thrust collar, 36, which is adjustably mounted upon the rod, 35, and is secured against outward movement by the nut, 37, and jam nut, 38. Thimble, 29, is not necessary in this draw-back mechanism, and is not shown in Figs. 3 and 4.

The operation of my improved draw-back mechanism is as follows:

The work having been placed loosely upon or in the chucking device, such, for instance as is illustrated in Fig 3, the wedge collar, 21, is forced toward the fingers, 15, as in the case of operating the push-out collet above described. The long ends, 25, of the fingers are forced outward by the tapered extension, 23, causing the short arms, 24, of the fingers to press against the follower, 12. The follower, 12, is now, however, prevented from moving endwise in spindle, 2, by the fact that the projections, 13, strike against the bottoms of slots, 14, the clearance space at the bottoms of these slots having been taken up by proper adjustment of nut, 37, and jam nut, 38. The finger holder, 16, is therefore forced outward against the thrust collar, 36, and the rod, 35, is thereby drawn backward in the lathe spindle, 2, pulling with it the chuck actuating member and causing the work to be securely held for machining. It will be seen that the follower, 12, in this case provides a hard, easily renewable surface in the bottom of the slot, 14, for the abutment of short arm, 24, of finger, 15.

It will be noted that finger, 15, is now a lever of the second class, in which the load is applied to the pin, 17, the power to the long arm, 25, and the fulcrum being where short arm, 24, rests on follower, 12.

For the operation of chucks which may require a greater movement of the plunger than can be secured from the fingers 15, when they fulcrum upon short arms, 24, I have devised the thrust collar, 36, one side of which is provided with projections, 39, 39, which extend a short distance through the slots, 27ª, 27ª, in sleeve or finger holder, 16, and abut against the knuckles, 28, of fingers, 15. To make use of these projections, 39, the thrust collar, 36, is reversed in position from that shown in Fig. 3, to that shown in Fig. 4. Upon operating the wedge collar, 21, with the thrust collar, 36, so reversed, the knuckles, 28, of fingers, 15, abut against projections, 39, and the plunger moving force is applied to the thrust collar through these knuckles instead of through the sleeve or finger-holder, 16. The load arm of the lever (finger 15) is now the distance from the point where short arm, 24, abuts on follower, 12, to the knuckle, 28. This distance being greater than that from this point to the pin, 17, it follows that a greater movement of the plunger will be caused by the same movement of the fingers, 15, when thrust collar, 36, is in the position shown in Fig. 4, than when it is in the position shown in Fig. 3.

It will be understood that the knuckles, 28, of the fingers, 15, may be extended through slots, 27ª, to abut against thrust collar, 36, and that in such a construction the projections, 39, will not be required. But, I prefer to use the form of finger lever shown in the drawings, as it is a standard form in certain lathes with which I am familiar.

By adjusting the position of thrust collar, 36, by means of nut, 37, and jam nut, 38, the extent of movement of the plunger rod, 35, may be nicely regulated. In a similar manner, the extent of movement of the push-out plunger, 11, may be regulated by adjusting the position of thrust collar, 19, upon spindle, 2.

It will be seen that all parts of my improved chuck operating devices, are made to rotate with the lathe spindle so that they are subjected to a minimum of wear.

It will be understood that the character of the chuck or collet, or the means and method of engaging the work therein forms no part of my invention, as these things are old and well understood in the art. To show the adaptability of my improvement, however, I have illustrated several well known devices for holding work in lathes.

For instance, in Fig. 1, there is shown a common form of push-out collet, adapted to engage rod or bar stock, 40, fed to it through the hollow lathe spindle, or to engage short pieces placed in it from the front end.

In Fig. 2 there is shown in engaged position for machining, a grease cup, 41, which has one threaded end screwed into the adapter, 42, until it bottoms on the end of plug, 43, which abuts against the push-out plunger. The action of the cutting tools upon the work, 41, screws the latter hard against the plug, 43, during the cutting operation, so that it would be difficult to unscrew it, if it were bottomed against a fixed part of the lathe spindle. When the cutting operation is finished, however, the plug, 43, is allowed to back away from the work, 41, by the withdrawal of the wedge collar from beneath the fingers, 15, and the work may be readily unscrewed from the adapter.

In Fig. 3, is illustrated an expanding chuck or mandrel for holding hollow cylindrical work, such as the bearing bushing, 44, shown in this figure. In this case the drawback feature of my improvement is utilized to draw the internally tapered expanding mandrel member, 45, over the externally tapered fixed plug, 46, to expand mandrel, 45, to hold the bushing, 44, while it is being machined.

In Fig. 4, is illustrated an outside, or contracting jaw collet engaging a gear blank, 47, which forms the work being machined. In this case the draw back feature of my improvement is shown in use and the thrust collar, 36, is shown reversed to give increased movement to the plunger rod, 35.

Other applications and modifications of my improvement will occur to those skilled in the art.

I claim and desire to secure by Letters Patent:

1. In a machine of the class described, the combination with a hollow spindle; of a chucking device mounted upon one end of said spindle; a rod slidably mounted in and extending outward past the other end of said spindle; means coöperating with the rod and the chucking device, whereby movement of the rod imparts movement to the work engaging members of the chucking device; a thrust collar secured to the rod; and means mounted on said spindle and adapted, when operated, to press upon the thrust collar and re-act upon said spindle to draw the rod through said spindle.

2. In a machine of the class described, the combination with a hollow spindle; of a chucking device mounted upon one end of said spindle; a rod slidably mounted in and extending outward past the other end of said spindle; means coöperating with the rod and the chucking device whereby movement of the rod imparts movement to the work engaging members of the chucking device; a thrust collar secured to the rod; a sleeve slidably mounted on said spindle; a lever pivoted upon a transverse pin to the sleeve; means for rocking the lever about said pin; and means forming a fulcrum for the lever, whereby, when the lever is rocked about its pivot, said sleeve is moved longitudinally against the thrust collar to draw the rod through said spindle.

3. In a machine of the class described, the combination with a hollow spindle; of a chucking device mounted upon one end of said spindle; a rod slidably mounted in and extending outward past the other end of said spindle; means coöperating with the rod and the chucking device whereby movement of the rod imparts movement to the work engaging members of the chucking device; a thrust collar secured to the rod; a sleeve slidably mounted on said spindle; a lever pivoted upon a transverse pin to the sleeve and having a knuckle abutting against the thrust collar; means for rocking the lever about said pin; and means forming a fulcrum for the lever, whereby, when the lever is rocked about its pivot, the knuckle presses against the thrust collar to draw the rod through said spindle.

4. In a machine of the class described, the combination with a hollow spindle; of a chucking device mounted upon one end of said spindle; a rod slidably mounted in and extending outward past the other end of said spindle, means coöperating with the rod and the chucking device whereby movement of the rod imparts movement to the work engaging members of the chucking device; a thrust collar secured to the rod; a sleeve slidably mounted on said spindle; a bell-crank lever pivoted upon a transverse pin to the sleeve; a wedge collar slidably mounted on said spindle; said lever having an arm extending longitudinally of said spindle and resting upon the surface of the wedge collar whereby longitudinal movement of the wedge collar toward the lever causes the rocking of the lever about its pivot in the sleeve; said lever having a second arm projecting toward the axis of said spindle, and engaging a transverse shoulder on said spindle, whereby, when the lever is rocked about its pivot by the wedge collar, the sleeve is moved longitudinally against the thrust collar to draw the rod through said spindle.

5. In a machine of the class described, the combination with a hollow spindle; of a chucking device mounted upon one end of said spindle; a rod slidably mounted in and extending outward past the other end of said spindle; means coöperating with the rod and the chucking device whereby movement of the rod imparts movement to the work engaging members of the chucking device; a thrust collar secured to the rod; a sleeve slidably mounted on said spindle; a bell-crank lever pivoted upon a transverse pin to said sleeve; a wedge collar slidably mounted on said spindle; said lever having an arm extending longitudinally of said spindle and resting upon the tapered surface of said wedge collar whereby longitudinal movement of the wedge collar toward the lever causes the rocking of the lever about its pivot on the sleeve; said lever having a second arm projecting toward the axis of said spindle, engaging a transverse shoulder on said spindle, said lever having a knuckle abutting against said thrust collar; whereby, when the lever is rocked about its pivot by the wedge collar, the knuckle presses against the thrust collar to draw the rod through said spindle.

6. In a machine of the class described, the combination with a hollow spindle having a longitudinal slot in one end; of a chucking device mounted upon the other end of said spindle; a rod slidably mounted in said spindle and extending outward past said slotted end; means connecting the rod with the chucking device whereby movement of the rod imparts movement to the work engaging members of the chucking device; a thrust collar secured to the rod and having a radial projection extending through said slot; a sleeve slidably mounted on said spindle; a lever pivoted upon a transverse pin to said sleeve, extending longitudinally parallel to said spindle and resting upon a tapered wedge collar slidably mounted on said spindle; said wedge collar being adapted when moved toward said lever to rock the lever about its pivot; said lever being provided with an arm projecting into said longitudinal slot; and means on said spindle, forming a fulcrum for the lever, whereby, when the lever is rocked about its pivot, the sleeve is moved longitudinally against the projection on said thrust collar to draw the rod through said spindle.

7. In a machine of the class described, the combination with a hollow spindle having a longitudinal slot in one end; of a chucking device mounted upon the other end of said spindle; a rod slidably mounted in said spindle and extending outward past said slotted end; means connecting the rod with the chucking device whereby movement of the rod imparts movement to the work engaging members of the chucking device; a thrust collar secured to the rod and having a radial projection extending through said slot; a sleeve slidably mounted on said spindle; a lever pivoted upon a traverse pin to the sleeve, extending longitudinally parallel to said spindle and resting upon a tapered wedge collar slidably mounted on said spindle; said wedge collar being adapted when moved toward said lever to rock the lever about its pivot; said lever being provided with an arm projecting into said longitudinal slot, and with a knuckle abutting against said projection on the thrust collar; and means on said spindle, forming a fulcrum for the lever, whereby, when the lever is rocked about its pivot, the knuckle presses against the projection on the thrust collar to draw the rod through said spindle.

8. In a machine of the class described, the method of converting a push-out chuck operating device to a draw-back chuck operating device which consists; of removing the push-out chuck from spindle, 2; removing the thrust collar, 19, and thimble, 29, from spindle, 2; inserting into the hollow spindle, 2, the rod, 35, on which is secured the thrust collar, 36; adjusting thrust collar, 36, into contact with sleeve, 16, when short arm, 24, of lever, 15, is in contact with follower, 12, and follower, 12, is in contact with the bottom of slot, 14, in spindle, 2; mounting a draw-back chuck upon the head end of spindle, 2; and making mechanical connections between rod, 35, and the work engaging member of said draw-back chuck; whereby, when the lever, 15, is rocked in the manner it is rocked to operate a push-out chuck, said lever will fulcrum on follower, 12, and cause sleeve, 16, to exert longitudinal backward pressure upon thrust collar, 36, to draw rod, 35, through said spindle, 2, thereby causing the work engaging member of the draw-back chuck to engage the work, as described.

9. In a machine of the class described, the method of converting a push-out chuck operating device to a draw-back chuck operating device which consists; of removing the push-out chuck from spindle, 2; removing the thrust collar, 19, and thimble, 29, from hollow spindle, 2; inserting into the hollow spindle, 2, the rod, 35, on which is secured the thrust collar, 36; adjusting thrust collar, 36, into contact with knuckle, 28, of lever, 15, when short arm, 24, of said lever is in contact with follower, 12, and follower, 12, is in contact with the bottom of slot, 14, in spindle, 2; mounting a draw-back chuck upon the head end of spindle, 2; and making mechanical connections between rod, 35, and the work engaging member of said draw-back chuck; whereby, when the lever, 15, is rocked in the manner it is rocked to operate a push-out chuck, said lever will fulcrum on follower, 12, and cause knuckle, 28, to exert longitudinal, backward pressure upon thrust collar, 36, to draw rod, 35, through said spindle, 2, thereby causing the work engaging member of the draw-back chuck to engage the work, as described.

10. In a machine of the class described, provided with a hollow spindle having a push out chuck mounted on one end thereof, said spindle having a longitudinal slot and a transverse shoulder; a follower slidably mounted in said hollow spindle; a sleeve slidably mounted on said spindle; a lever pivoted to said sleeve and having one end extending into said slot and engaging said follower; a push out chuck operating rod slidably mounted in said spindle and adapted to transmit motion from said follower to the work engaging members of said push out chucking device; a thrust collar secured to said spindle forming an abutment for said sleeve whereby when said lever is rocked about its pivot said follower is pressed aganst said rod to operate said push out chucking device: the method of changing said machine to use a draw back chucking device which consists of removing said push out chuck, said push out chuck operating rod and said thrust collar from said spindle and respectively substituting therefor a draw back chuck, a draw back chuck operating rod slidably mounted in said spindle, and a thrust collar mounted on said draw back chuck operating rod; and adjusting said parts so that said follower engages said transverse shoulder on said spindle when said end of said lever engages said follower and said sleeve engages said thrust collar on said draw back chuck operating rod; whereby, when said lever is rocked about its pivot said sleeve is pressed against said thrust collar to operate said draw back chucking device.

11. In a machine of the class described, the combination with a hollow spindle adapted to have a chucking device mounted on one end thereof, and having a longitudinal slot through its wall and a transverse shoulder: of a follower mounted in said hollow spindle engaging said shoulder; a sleeve slidably mounted on said spindle; and a lever pivoted upon a transverse pin to said sleeve having one end engaging said follower, whereby, when said lever is rocked about its pivot to cause its said end to press upon said follower, longitudinal movement is imparted to said sleeve.

12. In a machine of the class described provided with a hollow spindle having a draw back chuck mounted on one end thereof, said spindle having a longitudinal slot and a transverse shoulder; a follower slidably mounted in said hollow spindle and engaging said shoulder; a sleeve slidably mounted on said spindle; a lever pivoted to said sleeve and having one end extending into said slot and engaging said follower; a draw back chuck operating rod slidably mounted in said spindle; and a thrust collar on said draw back chuck operating rod, engaged by said sleeve; whereby, when said lever is rocked about its pivot said sleeve is pressed against said thrust collar to draw said rod through said spindle to operate said draw back chuck: the method of changing said machine to use a push out chuck which consists of removing said draw back chuck, said draw back chuck operating rod and its thrust collar from said machine and respectively substituting therefor a push out chuck; a push out chuck operating rod slidably mounted in said spindle, adapted to engage said follower and to transmit motion from said follower to the work engaging members of said push out chuck; and a thrust collar secured to said spindle and adapted to be engaged by said sleeve; and adjusting said parts so that said follower is disengaged from said shoulder, and engages said push out chuck operating rod when said end of said lever engages said follower and said sleeve engages said thrust collar on said spindle; whereby, when said lever is rocked about its pivot said end of said lever is pressed against the follower and the follower is pressed against the push out chuck operating rod to operate the push out chuck.

13. The combination with a lathe having a hollow spindle adapted to receive a chuck operable either by a push-rod or a pull-rod extending through said hollow spindle, of means for operating said rod embodying a pivoted lever, means for swinging said lever on its pivot, and devices whereby the same rocking movement of said lever on its pivot will operate a chuck of the push-rod type or a chuck of the pull-rod type.

14. The combination with a lathe having a hollow spindle adapted to receive a chuck operable either by a push-rod or a pull-rod extending through said hollow spindle, of means for operating said rod embodying a pivoted lever, means for swinging said lever on its pivot, and devices whereby said lever operates as a first-class lever with a chuck of the push-rod type and as a second-class lever with a chuck of the pull-rod type.

15. The combination with a lathe having a hollow spindle adapted to receive a chuck operable either by a push-rod or a pull-rod extending through said hollow spindle, of means for operating said rod embodying a pivoted lever, means for swinging said lever on its pivot, and devices whereby said lever operates as a first-class lever with a chuck of the push-rod type and as a second-class lever with a chuck of the pull-rod type, said devices embodying a sleeve slidably mounted on the spindle and carrying the lever.

16. The combination with a lathe having a hollow spindle adapted to receive a chuck operable either by a push-rod or a pull-rod extending through said hollow spindle, of means for operating said rod embodying a pivoted lever, means for swinging said lever on its pivot, and devices whereby the same rocking movement of said lever on its pivot will operate a chuck of the push-rod type or a chuck of the pull-rod type, said devices embodying a sleeve slidably mounted on the spindle and carrying the lever.

17. The combination with a lathe having a hollow spindle adapted to receive a chuck operable either by a push-rod or a pull-rod extending through said hollow spindle, of means for operating said rod embodying a pivoted lever, means for swinging said lever on its pivot, and devices whereby said lever operates as a first-class lever with a chuck of the push-rod type and as a second-class lever with a chuck of the pull-rod type, said devices embodying a thrust follower adapted to abut in one case against the end of the spindle and in the other case against the end of the push-rod.

In testimony whereof I affix my signature in the presence of two witnesses.

FREDERIC C. BUSCH.

Witnesses:
 ALFRED C. NELSON,
 FRANCES K. MANN.

Copies of this patent may be obtained for five cents each, by addressing the "Commissioner of Patents, Washington, D. C."